United States Patent [19]

Kazama et al.

[11] 4,038,304

[45] July 26, 1977

[54] URETHANE PREPOLYMER

[75] Inventors: Seiji Kazama, Kawanishi; Michio Tanaka, Takatsuki; Katsuki Nagano, Suita, all of Japan

[73] Assignee: Takeda Chemical Industries, Ltd., Osaka, Japan

[21] Appl. No.: 576,136

[22] Filed: May 9, 1975

[30] Foreign Application Priority Data

May 20, 1974 Japan .................................. 49-56978
Apr. 11, 1975 Japan .................................. 50-44473

[51] Int. Cl.$^2$ ............................................ C07C 125/06
[52] U.S. Cl. ........................... 260/468 E; 260/77.5 AT
[58] Field of Search ..................... 260/468 E, 77.5 AT

[56] References Cited

U.S. PATENT DOCUMENTS 3,634,306  1/1972  Schroeder .................... 260/77.5 AT
3,830,785  8/1974  Matsui ........................... 260/77.5 AT
3,883,577  5/1975  Rabizzoni .......................... 260/482 B

FOREIGN PATENT DOCUMENTS 2,245,722  4/1973  Germany
1,208,595  10/1970  United Kingdom

*Primary Examiner*—Lorraine A. Weinberger
*Assistant Examiner*—Michael Shippen
*Attorney, Agent, or Firm*—Wenderoth, Lind & Ponack

[57] ABSTRACT

A polyurethane prepolymer composition comprising (1) not less than 0.65 by weight of the idealized adduct from trimethylolpropane with 3 moles of 3-isocyanatomethyl-3,5,5-trimethylcyclohexylisocyanate and (2) not more than 0.05 by weight of 3-isocyanatomethyl-3,5,5-trimethylcyclohexylisocyanate relative to the whole composition is very suitable for an isocyanate component of a two-package urethane coating and gives a coating film having excellent gloss, weathering resistance, adhesivity and impact resistance.

3 Claims, No Drawings

URETHANE PREPOLYMER

This invention relates to an isocyanate-terminated polyurethane polymer composition. More particularly, the invention relates to an isocyanate-terminated polyurethane prepolymer composition based on 3-isocyanatomethyl-3,5,5-trimethylcyclohexylisocyanate, said prepolymer composition having excellent solubility in organic solvents, as well as excellent compatibility with polyol components, besides being capable of providing a coating film with markedly improved resistance to weathering.

While a variety of urethane coatings are available on the market today, these coatings generally are poorly resistant to weathering, being prone to yellowing upon exposure to light.

Tolylene diisocyanate (TDI)-based coatings are particularly deficient in weathering quality.

With a view to investing coatings films with an improved resistance to weathering, coatings based on aliphatic diisocyanates such as hexamethylene diisocyanate (HDI), 4,4'-dicyclohexylmethane diisocyanate, etc. and also on xylylene diisocyanate (XDI) have been contemplated but none of them has proved satisfactory.

Recently, it was known that coating films based on 3-isocyanatomethyl-3,5,5-trimethylcyclohexylisocyanate, which was prepared from 3-isocyanatomethyl-3,5,5-trimethylcyclohexylisocyanate-low molecular polyol adducts and polyalcohols, generally displayed superior resistance to weathering. (3-Isocyanatomethyl-3,5,5,-trimethylcyclohexylisocyanate is also known "isophorone diisocyanate" and is hereinafter referred to briefly as "IPDI".)

A further study of said low molecular polyols to be reacted with IPDI revealed that the use of glycols such as ethylene glycol, propylene glycol, diethylene glycol, dipropylene glycol, 1,3-butanediol, 1,4-butanediol, 1,6-hexanediol, neopentyl glycol not only interfere with the drying characteristic of the resultant coatings but also provide a reduced film hardness, thus being of no practical value. It was also found that coatings prepared from acrylic polyols in combination with IPDI-polyol adducts, whose polyols are such various triols as glycerin, 1,2,6-hexanetriol and trimethylolethane, or such tetra- or higher functional polyols as pentaerythritol, sorbitol and sucrose, result in films with inadequate adhesion and impact resistance characteristics thus being of no practical utility in coating applications.

It was further discovered that coatings based on the adducts obtainable from IPDI with trimethylolpropane (herinafter referred to briefly as "TMP" ) showed relatively good adhesivity and impact resistance.

A further study of IPDI-TMP adducts revealed that the adducts obtained by reacting IPDI with TMP after the conventional manner is polyurethane chemistry, i.e. at an NCO/OH ratio of 2.0:1 (3 moles of IPDI and 1 mole of TMP) provided only a poor compatibility with polyol components. In this case, by-products are formed, such as, an adduct from 2 moles of TMP with 5 moles of IPDI and its further polymerized adducts, in addition to the idealized adduct from TMP with 3 moles of IPDI, and these by-products and the unreacted IPDI are assumed to have a bad influence upon the compatibility with polyol components.

The idealized adduct from TMP with 3 moles of IPDI is shown as below.

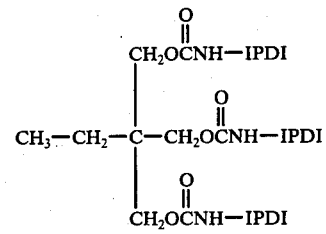

Referring to the above formula, "—IPDI" represents IPDI whose one NCO group is reacted with one of the hydroxyl groups of TMP, and the other is free NCO group.

In this specification and claims, the term "idealized adduct" is used in the meaning as described in, for example, "J. H. Saunders et al. Polyurethanes, chemistry and Technology, Part II. Technology", and is generally used in polyurethane coatings.

It was discovered, however, that a polyurethane prepolymer composition comprising (1) not less that 0.65 by weight of the idealized adduct from trimethylolpropane with 3 moles of IPDI and (2) not more than 0.05 by weight of IPDI monomer relative to the whole composition not only provides a coating film with excellent resistance to weathering but is superbly compatible with polyols (e.g. polyester polyols, polyether polyols, polyester ether polyols, oil-modified polyester polyols, acrylic polyols) and highly soluble in organic solvents, thus leading itself particularly well to urethane coating prepolymer applications.

The present invention is accomplished on the basis of these new findings.

An object of the present invention is to provide a polyurethane prepolymer composition comprising (1) not less than 0.65 by weight of the idealized adduct from trimethylolpropane with 3 moles of IDPI and (2) not more than 0.05 by weight of IPDI monomer relative to the whole composition.

Another object is to provide a polyurethane prepolymer composition which is compatible with various kinds of polyols such as polyester polyols, polyether polyols, polyester ether polyols, oil-modified polyester polyols and acrylic polyols and can give a coating film having excellent resistance to weathering, gloss, adhesivity and impact resistance.

Another object is to provide a method for the production of said polyurethane prepolymer composition with ease in operation and good efficiency.

These and other objects of this invention will be apparent from the detailed description hereinafter provided.

In the present invention, the weight ratio of the idealized adduct from TMP with with 3 moles of IPDI is (1) not less than 0.65, preferably not less than 0.70 and more preferably not less than 0.75 and (2) the weight ratio of IPDI monomer is not more than 0.05, preferably not more than 0.03 more preferably not more than 0.01 relative to the whole composition.

The other components than the above is exemplified by the adduct from 2 moles of TMP with 5 moles of IPDI and its further polymerized adducts etc.

The contents of the idealized adduct from TMP with 3 moles of IPDI and IPDI monomer of the present polyurethane prepolymer composition are estimated by, for example, gel permeation chromatography.

The present polyurethane prepolymer composition is prepared by a conventional method. That is, the prepolymer composition can be easily prepared by reacting IPDI with TMP at an optional NCO/OH ratio, followed by removing the unreacted IPDI monomer and the by-products other than the idealized adduct from TMP with 3 moles of IPDI through suitable methods.

The reaction of IPDI with trimethylolpropane (TMP) according to the present invention can be conducted even in the absence of a solvent as well as in the presence of a solvent free of active hydrogen (e.g. ethyl acetate, butyl acetate, tetrahydrofuran, dimethylformamide, dimethylacetamide, methyl ethyl ketone, dioxane or the like).

The reaction temperature may be in the range of 40° to 150° C, preferably 60° to 90° C. Following completion of the reaction, the solvent, if used, is distilled off. An organometallic catalyst is preferably added to the reaction mixture of IPDI and TMP.

As the aforesaid organometallic catalyst, there may be tin-containing organometallic compounds such as, distannoxanes of the general formula:

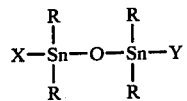

[wherein R represents an alkyl group of 1 to 20 carbon atoms; X and Y may be the same or different, each representing a halogen atom, a hydroxyl group, an isocyanato group, a thioisocyanato group or a carboxylic acid residue]; compounds of the general formula:

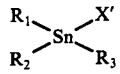

[wherein $R_1$ and $R_2$, respectively, represent an alkyl group of 1 to 20 carbon atoms; $R_3$ represents an acid residue, an alkyl or alkoxy group of 1 to 20 carbon atoms; X' represents an acid residue; with the proviso that $R_3$ and X', taken together, may form =O or =S]; and compounds of the general formula:

[wherein $R_4$ represents a higher organic carboxylic acid residue].

Referring to the above general formulas, the alkyl groups represented by R, $R_1$, $R_2$ and $R_3$ are exemplified by methyl, ethyl, propyl, butyl, octyl, lauryl, stearyl, and so on. The halogen X, Y may for example be chlorine, fluorine, bromine or iodine. The alkoxy groups represented by $R_3$ are exemplified by methoxy, ethoxy, propoxy, butoxy and so on. As the acid residues represented by $R_3$ and X', there may be mentioned inorganic acid residues and organic acid residues containing 1 to 18 carbon atoms, thus being exemplified by halogens (e.g. chlorine, bromine, fluorine and iodine), acetoxy, lauroyloxy, maleoyloxy, 2-ethylhexanoyloxy and so on. The higher organic carboxylic acid residue represented by $R_4$ preferably contains 8 to 30 carbon atoms, thus being exemplified by otanoyloxy, nonanoyloxy, decanoyloxy, undecanoyloxy and so on.

The following is a partial listing of the organotin compounds defined hereinbefore.

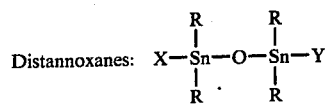

Tetrabutyl-1-chloro-3-hydroxy-distannoxane;
Tetrabutyl-1,3-diacetoxy-distannoxane;
Tetrabutyl-1,3-distearoyloxy-distannoxane;
Tetrabutyl-1,3-diformyloxy-distannoxane;
Tetrabutyl-1,3-(2'-ethylhexanoyloxy)-distannoxane;
Tetrapropyl-1-chloro-3-hydroxy-distannoxane;
Tetrabutyl-1,3-dilauroyloxy-distannoxane;
Tetraethyl-1-chloro-3-hydroxy-distannoxane;
Tetramethyl-1-chloro-3-hydroxy-distannoxane;
Tetrapropyl-1,3-diacetoxy-distannoxane;
Tetrabutyl-1,3-diacryloyloxy-distannoxane;
Tetrabutyl-1,3-dicyanoacetoxy-distannoxane;
Tetrabutyl-1,3-dibenzyloyloxy-distannoxane;
Tetraethyl-1,3-diacetoxy-distannoxane;
Tetrabutyl-1-hydroxy-3-acetoxy-distannoxane;
Tetrabutyl-1-hydroxy-3-formyloxy-distannoxane;
Tetrabutyl-1,3-bis(monomethylmaleoyloxy)-distannoxane;
Tetrabutyl-1-hydroxy-3-lauroyloxy-distannoxane;
Tetrabutyl-1-chloro-3-methoxy-distannoxane;
Tetrabutyl-1-chloro-3-ethoxy-distannoxane;
Tetrabutyl-1,3-diisocyanato-distannoxane;
Tetrabutyl-1,3-diisothiocyanato-distannoxane;
Tetrapropyl-1,3-diisocyanato-distannoxane;
Tetrapropyl-1,3-diisothiocyanato-distannoxane,
Tetrapropyl-1,3-diformyloxy-distannoxane;
Tetrabutyl-1-methoxy-3-acetoxy-distannoxane;
Tetrabutyl-1,3-dimaleoyloxy-distannoxane;
Tetrabutyl-1-hydroxy-3-monomethylmaleoyloxy-distannoxane; and
Tetrabutyl-1,3-dichloro-distannoxane.

Compounds of the general formula:

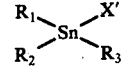

Dibutyltin dichloride;
Dibutyltin dibromide;
Dibutyltin oxide;
Dibutyltin dilaurate;
Dibutyltin maleate;
Dibutyltin diacetate;
Dibutyltin di-2-ethylhexoate;
Dibutyltin sulfide;
Tributyltin sulfide;
Tributyltin oxide;
Tributyltin acetate;
Tributyltin ethoxide;
Triethyltin ethoxide;
Triethyltin acetate;
Dioctyltin oxide;
Tributyltin chloride;
Tributyltin trichloroacetate.

Compounds of the general formula:

Stannous octoate

In addition to the aforementioned organotin compounds, there may be further mentioned such lead compounds as lead oleate, lead benzoate, lead 2-ethylhexanoate, lead naphthenate, etc.; titanium compounds, (e.g. dibutyltitanium dichloride, tetrabutyl titanate, butoxytitanium trichloride), iron compounds (e.g. iron 2-ethylhexanoate, iron acetylacetonate), antimony compounds (e.g. triphenylantimony dichloride), cobalt compounds (e.g. cobalt benzoate, cobalt 2-ethylhexanoate), zinc compounds (e.g. zinc 2-ethylhexanoate, zinc naphthenate), manganese 2-ethylhexanoate and zirconium naphthenate and so on. Among these organometallic compounds, organotin compounds, particularly dibutyltin dilaurate and tetrabutyl-diacetoxy-distannoxane, are preferred.

The amount of such a catalyst is about 0.01 to 5 weight percent, preferably about 0.03 to 2 weight percent based on the weight of IPDI.

As the methods for removing the unreacted IPDI monomer and the by-products from the reaction mixture of IPDI and TMP, there may be mentioned conventional methods such as, extraction with an organic solvent, distillation, chromatography, precipitation and a combination of these methods.

These methods will be described below in more detail.

1. EXTRACTION

According to this method, the stoichiometric ratio (NCO/OH) of IPDI to TMP is 3:1 to 8:1, preferably 4:1 to 6:1.

Should the ratio be less than 3:1, the resultant coating film would have only inadequate adhesivity and impact resistance. Conversely, at ratios exceeding 8:1, it would be extremely difficult to remove the unreacted IPDI, with yields being far low, thus the process being of no practical utility.

As the extracting agent, an aliphatic hydrocarbon is conveniently employed. Preferred among such aliphatic hydrocarbons are those boiling in the range of 50° to 100° C. Thus, for example, n-heptane, n-hexane, ligroine, n-octane, 3-methylpentane, 3-ethylpentane or petroleum benzine or a mixture of them may be employed.

Since the prepolymer composition is highly soluble in organic solvents, it is extremely difficult to obtain the desired prepolymer composition in high purity and satisfactory yield by removing the unreacted IPDI alone with an extractant. For such purposes, it is advisable to carefully select the type of extractant and other conditions. From this consideration, n-hexane is the most preferred of the aforementioned extractants. The extraction temperature may range from 15° to 90° C and, preferably, 30° to 60° C. The extraction may be carried out in a conventional manner, whether continuous or batch-wise. The amount of the extractant is once to 4 times, preferably twice to 3 times the weight of the reaction mixture in the case of continuous extraction and twice to 6 times, preferably 3 to 5 times the weight of the reaction mixture for a batch process. The extraction residue thus obtained contains a small amount of an extractant and the extractant is thoroughly distilled off. The unreacted IPDI monomer in an extract is recovered by distillation of the extract and re-used for the reaction of TMP and IPDI.

2. DISTILLATION

According to this method, it is preferred that the ratio (NCO/OH) of IPDI to TMP is as large as possible, but in view of an economical point the ratio is 3:1 to 10:1 and, preferably 4:1 to 7:1.

Distillation may be carried out in a conventional manner, batch-wise or continuously.

In order to prevent the degradation of a resultant polyurethane prepolymer by heating, distillation is preferably conducted in a continuous film evaporator having a relatively short residence time.

To state it more concretely, the reaction mixture of IPDI and TMP is introduced into a continuous film evaporator and the unreacted IPDI is distilled off at about 150°-200° C under reduced pressure of not more than about 1.0 mmHg. The IPDI monomer removed from the evaporator is re-used for the reaction of IPDI and TMP.

3. CHROMATOGRAPHY

As the chromatographic methods, there may be mentioned chromatographies such as, column chromatography, thin layer chromatography, paper chromatography and so on.

In this method, the reaction of IPDI with TMP may be conducted at an optional NCO/OH ratio and, preferably 3:1 to 10:1. Separation of the by-products and the unreacted IPDI monomer from the idealized adduct from TMP with 3 moles of IPDI is conducted according to purfication and separation procedures of organic compounds.

In case of column chromatography, the adsorption column is formed by tamping or by pressing a finely powdered, adsorptive solid (e.g. silica gel) into a glass tube which is constricted at one end and loosely plugged with a wad of glass wool. The reaction mixture is filtered into the upper portion of the column, so that the idealized adduct from TMP with 3 moles of IPDI, by-products and unreacted IPDI monomer are absorbed. The column is then washed with fresh solvent such as ethyl acetate. The said three or more components migrate through the column and are completely separated.

In general, it is preferable to treat the said reaction mixture as soon as possible, and under nitrogen atmosphere.

4. SEPARATION BY PRECIPITATION

In this method, the ratio (NCO/OH) of IPDI to TMP is preferably about 1.3:1 to 2.0:1. The reaction mixture thus obtained contains the idealized adduct from TMP with 3 moles of IPDI and the by-products, not the unreacted IPDI monomer. Separation of these compounds is conducted according to selective precipitation technique generally used in high polymer chemistry. Namely, the idealized adduct can be separated from the by-products by precipitating the by-products with the addition of a precipitant to said reaction mixture. Namely, the precipitant, sufficient only to bring down the first fraction (i.e., the by-products), is added and the resultant precipitate is filtered off. The idealized adduct remains in the filtrate, from which it may be precipitated in a high yield by adding said precipitant to the filtrate.

As the precipitants, there may be mentioned the aforesaid extractants used in (1) extraction method.

The resultant polyurethane prepolymer composition thus obtained has an amine equivalent of about 240 to 350, and displays excellent solubility in organic solvents. For example, the prepolymer composition is soluble in ethyl acetate, butyl acetate, cellosolve acetate, benzene, toluene, xylene, methyl ethyl ketone, etc.

The prepolymer composition of the present invention is generally diluted with a solvent for use as the isocyanate component of a two-package urethane coating. Usually the prepolymer composition is diluted with ethyl acetate to a solids content of 20 to 75 weight percent and the solution is mixed with a polyol component for urethane coatings. The prepolymer composition of the present invention displays excellent compatibility with a broad range of polyols which are used as the polyol components of urethane coatings, including polyester polyols, polyether polyols, polyester ether polyols, oil-modified polyester polyols, acrylic polyols and so on, and, on admixture with any of them, provides a homogeneous clear varnish. Thus, such a varnish or the enamel prepared by pigmenting the varnish provides a coating film with excellent gloss and excellent weathering resistance, adhesivity and impact resistance.

For a further detailed explanation of the invention, the following examples and control examples are given, wherein the term "part(s)" means "part(s) by weight" unless otherwise specified. The term "%" means "% by weight".

EXAMPLE 1

To 200 parts of 3-isocyanatomethyl-3,5,5-trimethyl-cyclohexyl-isocyanate (IPDI) was added 1.2 parts of dibutyltin dilaurate and the mixture was heated at 80° C. Under stirring, 17.9 parts of fused trimethylolpropane (TMP) was added dropwise to the above mixture. The NCO/OH ratio of this system was 4.5. After the dropwise addition, the mixture was further stirred at 75°-80° C for 3 hours. At this time, the reaction mixture had an amine equivalent of 155.8 (theoretical: 155.6).

After the reaction, the temperature was lowered to 40°-45° C, at which level the unreacted IPDI was extracted 8 times with n-hexane. The amounts of n-hexane were 120 parts for the first extraction and 100 parts for each of the subsequent, i.e. the second to the 8th, extractions. Then, the small amount of n-hexane remaining in the extraction 40°-45° C, at which level the unreacted IPDI was extracted 8 times with n-hexane. The amounts of n-hexane were 120 parts for the first extraction and 100 parts for each of the subsequent, i.e. the second to the 8th, extractions. Then, the small amount of n-hexane remaining in the extraction residue was throughly distilled off, whereupon 90.8 parts of a prepolymer was obtained. (The yield based on the entire charge was 41.7%)

The free IPDI and the idealized adduct from TMP with 3 moles of IPDI contained in the extraction residue as estimated by gel permeation chromatography were 0.002 by weight and 0.76 by weight relative to the whole composition, respectively. To this extraction residue was added a sufficient amount of ethyl acetate to give a solids content of 75%. The amine equivalent of this prepolymer solution was 380.

This prepolymer solution is soluble with extreme readiness in organic solvents, among others, and can be diluted infinitely with ethyl acetate, butyl acetate, benzene, toluene, xylene, methyl ethyl ketone, methyl isobutyl ketone and so on.

To determine the solubility of the above-prepared urethane prepolymer solution relative to other urethane coating prepolymers, various diluents were added to 1-gram portions of the resin (each had a solids content of 75%) and the volumes (dilution) of the solvents required before white turbidity appeared were measured. The results are set forth in Table 1. The said other urethane prepolymers were such that they were prepared by using the same moles of hexamethylene diisocyanate and ω, ω'-1,3-dimethylbenzene, respectively, in place of 3-isocyanatomethyl-3,5,5-trimethyclyclohexylisocyanate. These prepolymers are designated as HDI- and XDI-series, respectively, in Table 1, the prepolymer obtained by the method of this invention being designated as IPDI-series.

Table I

| Prepolymer | Tolerance for diluents (%) of urethane coating resins | | |
|---|---|---|---|
| Diluents | Toluene | Xylene | n-Hexane |
| IPDI-series | Infinite | Infinite | 35 |
| HDI-series | 500 | 300 | 13 |
| XDI-series | 250 | 90 | 10 |

To determine the compatibility of the urethane prepolymer of the invention with a polyol component and with a conventional addivite relative to some other urethane coating prepolymers, one part of each resin (with a solids content of 75%) was mixed well with 3 parts of an acrylic polyol (solids content :50% OH value: 50) or cellulose acetate-butyrate (methyl isobutyl ketone solution, solids content: 20%) and each of the mixtures was visually inspected. The results are set forth in Table 2. In Table 2, the same prepolymer symbols as in Table 1 are employed. It will be seen that, in compatibility with both the polyol and additive, IPDI-series is superior to the other series.

Table 2

| | Compatibility with acrylic polyols and cellulose acetate-butyrate | |
|---|---|---|
| Prepolymer | Appearance after mixing with acrylic polyols | Appearance after mixing with cellulose acetate-butyrate |
| IPDI series | Clear | Clear |
| HDI series | Clear | White turbidity |
| XDI series | White turbidity | White turbidity |

The prepolymer solution of this example was formulated with a polyester polyol (OH value 130, acid value 4) which contained titanium oxide of the lutile type, to prepare a coating film (PWC 40%). Here, a coating film obtained by a similar procedure using 1,3 bis-(isocyanotomethyl)cyclohexane (referred briefly as $H_6XDI$) also tested as a control, which is designated below as $H_6XDI$-series.

The weathering resistance of the film was evaluated by ultraviolet exposure and compared with that of other films. The results are set forth in N.B.S. units in Table 3. In Table 3, the IPDI, HDI and XDI-series means the same as defined in connection with Table 1.

Table 3

| | | Film weathering test | | |
|---|---|---|---|---|
| Coating film | | Before UV irradiation | After 50 hours of UV irradiation | |
| IPDI-series film | L | 96.64 | 95.40 | |
| | a | −3.52 | −4.50 | Δ b=1.52 |
| | b | 3.17 | 4.69 | Δ E=2.19 |

Table 3-continued

Film weathering test

| Coating film | | Before UV irradiation | After 50 hours of UV irradiation | | |
|---|---|---|---|---|---|
| HDI-series | L | 96.43 | 94.81 | | |
| film | a | −3.54 | −5.02 | Δb=5.31 | |
| | b | 360 | 8.91 | ΔE=5.75 | |
| XDI-series | L | 94.72 | 92.62 | | |
| film | a | −3.73 | −5.62 | Δb=7.13 | |
| | b | 2.70 | 9.83 | ΔE=7.67 | |
| $H_6$XDI-series | L | 95.54 | 94.30 | | |
| film | a | −3.62 | −4.60 | Δb=2.71 | |
| | b | 3.17 | 5.88 | ΔE=3.14 | |

It is apparent from Table 3 that IPDI-series films are resistant to ultraviolet light, being particularly less prone to yellowing. This is clear from the corresponding Δb and ΔE values. Comparison of the coating film of this invention with the $H_6$XDI film indicates a difference of 1.19 in Δb values and a difference of 0.95 in ΔE, thus dwemonstrating that the coating film according to this invention is markedly superior to the $H_6$XDI film.

EXAMPLE 2

To 200 parts of IPDI was added 1 part of tetrabutyl-1,3-diacetoxydistannoxane, followed by heating to 70° C. Then, under agitation, 26.8 parts of fused trimethylolpropane was added dropwise over a period of 1 hour. The NCO OH ratio of this system was 3.0. After the dropwise addition was completed, the mixture was further heated at 70°-75° C under agitation for 3 hours. The system then had an amine equivalent of 188.8 (theoretical 189.0).

The unreacted IPDI was removed by extraction with n-hexane in the same manner as Example 1 L to recover 137.9 parts of residue (yield based on the entire charge: 61%). The amount of free IPDI and the idealized adduct in the residue were 0.001 by weight and 0.68 by weight relative to the whole composition, respectively. To this extraction residue was added a sufficient amount of ethyl acetate to give a solids content of 75%. After complete dissolution, there was obtained a clear prepolymer solution with an amine equivalent of 389

EXAMPLE 3

To 200 parts of IPDI was added 1.5 parts of stannous octoate, followed by heating to 80° C. Under agitation, 13.4 parts of fused trimethylol propane (TMP) was added dropwise over a period of 1 hour. The NCO/OH ratio of the system then was 6.0. After the dropwise addition was completed, the mixture was further agitated at 75°-80° C for 3 hours. The system then had an amine equivalent of 142.5 (theoretical 142.3).

The unreacted IPDI was removed by extraction with n-hexane in the same manner as Example 1 to recover 53.4 parts of residue (yield based on entire charge: 25%). The residue contained 0.002 by weight of free IPDI and 0.79 by weight of the idealized adduct relative to the whole composition.

To this extraction residue was added a sufficient amount of ethyl acetate to give a solids content of 75%. After complete dissolution, there was obtained a clear prepolymer solution with an amine equivalent of 385.

CONTROL EXAMPLE 1

200 Parts of IPDI was heated to 80° C and, under agitation, 17.9 parts of trimethylolpropane (TMP) was added dropwise over a period of 1 hour. The NCO/OH ratio of the system was 4.5, the same as that observed in Example 1. After the dropwise addition was completed, the mixture was further heated at 75°-80° C under agitation for 5 hours. The system then had an amine equivalent of 155.7 (theoretical 155.6).

Thereafter, the procedure of Example 1 was repeated to obtain a residue contained 0.002 by weight of free IPDI and 0.54 by weight of the idealized adduct relative to the whole composition. After complete dissolution, there was obtained a prepolymer solution with a solids content of 75%.

CONTROL EXAMPLE 2

To 200 parts of IPDI was added 1.2 parts of dibutyltin dilaurate, followed by heating to 80° C. Under agitation, 17.9 parts of fused trimethylolpropane was added dropwise over a period of 1 hour. The NCO/OH ratio of the system then was 4.5, the same as that observed in Example 1. After the dropwise addition was completed, the mixture was stirred at 75°-80° C for 3 hours. The reaction mixture contained 0.35 by weight of the idealized adduct and 0.54 by weight of free IPDI.

To this mixture was added 72.6 parts of ethyl acetate, followed by thorough mixing. The procedure provided a clear prepolymer solution with an amine equivalent of 207.7.

CONTROL EXAMPLE 3

To 200 parts of IPDI was added 1.2 parts of dibutyltin dilaurate, followed by heating to 80° C. Under agitation, 40.2 parts of fused trimethylolpropane (TMP) was added dropwise over a period of 1 hour. The NCO/OH ratio of the system was 2.0. After the dropwise addition was completed, the mixture was further agitated at 75°-80° C for 3 hours. The system then had an amine equivalent of 266.6 (theoretical 266.9).

Thereafter, the procedure of Example 1 was repeated to remove the unreacted IPDI with n-hexane to recover 190.2 parts of extraction residue. The residue contained not more than 0.001 by weight of free IPDI and 0.58 of the idealized adduct relative to the whole compotion. To this residue was added a sufficient amount of ethyl acetate to give a solids content of 75%, whereby a clear prepolymer solution with an amine equivalent of 397 was obtained.

EXAMPLE 4

The urethane prepolymers obtained in Examples 1, 2 and 3 and in Control Examples 1, 2 and 3 were each formulated with a portion of the acrylic polyol (solids contant 50%; OH value 20) which was prepared by copolymerizing 45 parts of styrene, 45 parts of methyl methacrylate and 10 parts of 2-hydroxyethyl methacrylate and the resultant coating compositions were coated onto identical substrates. The properties of the resultant coating films were evaluated and are shown in Table 4. Tests were preformed on the films after standing at 45° C for 3 days.

Table 4

| Prepolymer | Ex. 1 | Ex. 2 | Ex. 3 | Cont. Ex. 1 | Cont. Ex. 2 | Cont. Ex. 3 |
|---|---|---|---|---|---|---|
| Set to touch | 1 min. | 30 sec. | 1 min. | 1 min. | 2 min. | 30 sec. |

Table 4-continued

| Prepolymer | Ex. 1 | Ex. 2 | Ex. 3 | Cont. Ex. 1 | Cont. Ex. 2 | Cont. Ex. 3 |
|---|---|---|---|---|---|---|
| Dry through | 13 min. | 10 min. | 14 min. | 13 min. | 30 min. | 6 min. |
| Pencil hardness | 2H | 2H | 2H | 2H | H | 2H-3H |
| Cross-cut adhesion X*/100 | 100 | 98 | 100 | 20 | 10 | 10 |
| du Pont impact test (inches/g/cm) | ½×1000 ×30 Passed | ½×1000 ×20 Passed | ½×1000 ×30 Passed | ½×300 ×10 Failed | ½×300 ×10 Failed | ½×300 ×10 Failed |

*The number of squares remaining unpeeled.

EXAMPLE 5

To 200 parts of IPDI was added 1.2 parts of zinc naphthenate (14.5% Zn), followed by heating to 80° C. Under agitation, 17.9 parts of fused trimethylolpropane was added dropwise over a period of 1 hour. The NCO/OH ratio of the system then was 4.5. After the dropwise addition was completed, the mixture was further agitated at 75°-80° C for 3 hours. The system then had an amine equivalent of 155.9 (theoretical 155.6). Following completion of the reaction, the reaction mixture was cooled to 40°-45° C and while this temperature was maintained, the mixture was extracted 8 times with petroleum benzine to remove the unreacted IPDI. The amounts of petroleum benzine used were 120 parts for the first extraction and 100 parts for all the subsequent extractions. The small amount of petroleum benzine remaining in the extraction residue was distilled off under reduced pressure. The residue contained 0.022 by weight of free IPDI and 0.72 by weight of the idealized adduct relative to the whole composition. The residue was diluted with ethyl acetate in the same manner as Example 1 until the solids content was 75%. After complete dissolution, this prepolymer solution had an amine equivalent of 383.

EXAMPLE 6

To 200 parts of IPDI was added 1.2 parts of lead naphthenate (30.0% pb), followed by heating to 80° C. Under agitation, 17.9 parts of fused trimethylolpropane (TMP) was added dropwise over a period of 1 hour. The NCO/OH ratio of the system then was 4.5. After the dropwise addition was completed, the mixture was further agitated at 75°-80° C for 3 hours. The system then had an amine equivalent of 156.1 (theoretical 155.6). Following complettion of the reaction, the reaction mixture was cooled to 40°-45° C and while this temperature was maintained, it was extracted 8 times with petroleum benzine to remove the unreacted IPDI. The amounts of petroleum benzine used were 120 parts for the first extraction and 100 parts each for all the subsequent seven extractions. The small amount of petroleum benzine remaining in the extraction residue was distilled off under reduced pressure. The residue contained 0.02 by weight of free IPDI and 0.73 by weight of the idealized adduct relative to the whole composition. In the same manner as Example 1, the residue was evenly dissolved in ethyl acetate to a solids content of 75%.

The amine equivalent of this prepolymer solution was found to be 385. In the same manner as Example 4, the urethane prepolymers of Example 5 and 6 were each combined with the acrylic polyol to prepare coatings and tests were carried out on the resultant coatings films on identical substrates. The results are set forth in Table 5.

Table 5

| Prepolymer | Ex. 5 | Ex. 6 |
|---|---|---|
| Set to touch | 1 min. | 1 min. |
| Dry through | 14 min. | 15 min. |
| Pencil hardness | H-2H | 2H |
| Cross-cut adhesion(X/100) | 100 | 100 |
| du Pont impact test (inches/g/cm) | Passed | Passed |

EXAMPLE 7

To 137.8 parts of IPDI was added 0.091 parts of iron acetylacetonate, followed by heating to 80° C. Under agitation, 13.9 parts of fused trimethylolpropane (TMP) was added dropwise over a period of 1 hour. The NCO/OH ratio of the system then was 4.0. After the dropwise addition was completed, the mixture was further agitated at 75°-80° C for 2 hours. The reaction system then had an amine equivalent of 169.6. Following completion of the reaction, the reaction mixture was cooled to 40°-45° C and, while this temperature range was maintained, it was extracted 8 times with n-hexane to remove the unreacted IPDI. The small amount of n-hexane remaining in the extraction residue was distilled off under reduced pressure. The residue contained 0.002 by weight of free IPDI and 0.70 by weight of the idealized adduct relative to the whole composition. In the same manner as Example 1, the residue was evenly dissolved by the addition of ethyl acetate to give a solids content of 75%. The resultant prepolymer solution had an amine equivalent of 390. This solution was used in combination with the acrylic polyol as in Example 4. The coating tests revealed that the resultant coating film had excellent adhesivity and impact resistance.

CONTROL EXAMPLE 4

To 200 parts of 3-isocyanatomethyl-3,5,5-trimethylcyclohexyl-isocyanate (IPDI) was added 1.2 parts of dibutyltin dilaurate and the mixture was heated at 80° C. Under stirring, 17.9 parts of fused trimethylolpropane (TMP) was added dropwise to the above mixture. The NCO/OH ratio of this system was 4.5. After the dropwise addition, the mixture was further stirred at 75°-80° C for 3 hours. At this time, the reaction mixture had an amine equivalent of 155.8(theoretical: 155.6).

After the reaction, the temperature was lowered to 40°-45° C, at which level the unreacted IPDI was extracted 4 times with n-hexane. The amounts of n-hexane were 120 parts for the first extraction and 100 parts for each of the subsequent, i.e. the second to the 4th, extractions. Then, the small amount of n-hexane remaining in the extraction residue was thoroughly distilled off.

The free IPDI and the idealized adduct contained in the extraction residue as estimated by gel permeation chromatography were 0.07 by weight and 0.73 by weight relative to the whole composition, respectively.

To this extraction residue was added a sufficient amount of ethyl acetate to give a solids content of 75%.

In the same manner as Example 4, this prepolymer solution was combined with the acrylic polyol to prepare coatings and tests were carried out on the resultant coating films on identical substrates. The results are set forth. as follows.

| Set to touch | 1 min. |
|---|---|
| Dry through | 15 min. |
| Pencil hardness | 2H |
| Cross-cut adhesion (X/100) | 70 |
| du Pont impact test (inches/g/cm) | ½×500×10 Passed |

EXAMPLE 8

To 200 parts of 3-isocyanatomethyl-3,5,5-trimethylcyclohexyl-isocyanate (IPDI) was added 1.2 parts of dibutylin dilaurate and the mixture was heated at 80° C. Under stirring, 17.9 parts of fused trimethylolpropane (TMP) was added dropwise to the above mixture. The NCO/OH ratio of this system was 4.5. After the dropwise addition, the mixture was further stirred at 75°-80° C for 3 hours. At this time, the reaction mixture had an amine equivalent of 155.8 (theoretical: 155.6).

After the reaction, the reaction mixture was introduced into a continuous film evaporator and was distilled off the unreacted IPDI monomer at about 170°-175° C under reduced pressure of about 1 mmHg. The free IPDI and the idealized adduct contained in the resultant residue were 0.02 by weight and 0.76 by weight relative to the whole composition, respectively. To this residue was added a sufficient amount of ethyl acetate to give a solids content of 75%. The amine equivalent of this prepolymer solution was 380.

What is claimed is:

1. A polyurethane prepolymer composition consisting essentially of (1) not less than a weight ratio of relative to the 0.65 weight of the whole composition of the idealized adduct prepared from reacting trimethylolpropane with 3 moles of 3-isocyanatomethyl-3,5,5-trimethylcyclohexylisocyanate, (2) not more than a weight ratio of 0.05 of 3-isocyanatomethyl-3,5,5-trimethylcyclohexylisocyanate relative to the weight of the whole composition and (3) the remainder being essentially the by-products formed from the reaction producing the idealized adduct (1); and wherein said idealized adduct has the formula:

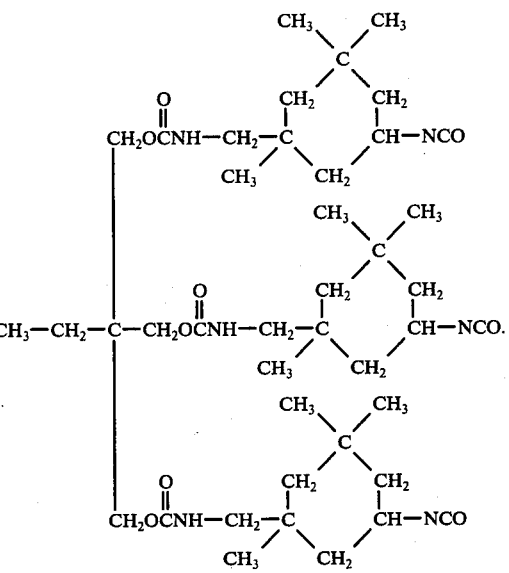

2. A polyurethane prepolymer composition as claimed in claim 1, wherein the weight ratio of the idealized adduct is not less than 0.7 relative to the weight of the whole composition and the weight ratio of 3-isocyanatomethyl-3,5,5-trimethylcyclohexylisocyanate is not more than 0.05 relative to the weight of the whole composition.

3. A polyurethane prepolymer composition as claimed in claim 1, wherein the weight ratio of the idealized adduct is not less than 0.75 relative to the weight of the whole composition and the weight ratio of 3-isocyanatomethyl-3,5,5-trimethylcyclohexylisocyanate is not more than 0.05 relative to the weight of the whole composition.

* * * * *